Aug. 25, 1931.  C. S. BUSQUE  1,820,434
SAW
Filed Oct. 24, 1930
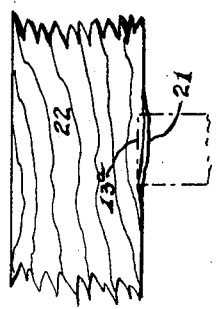
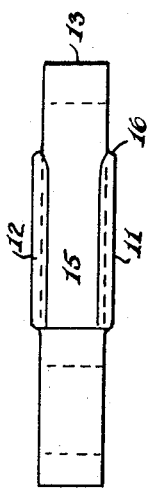
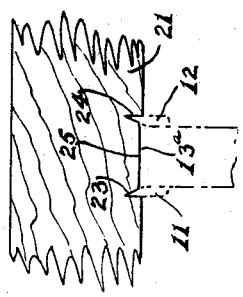
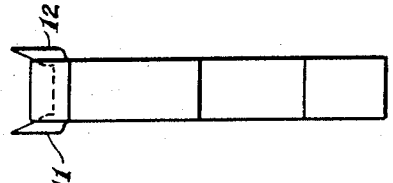
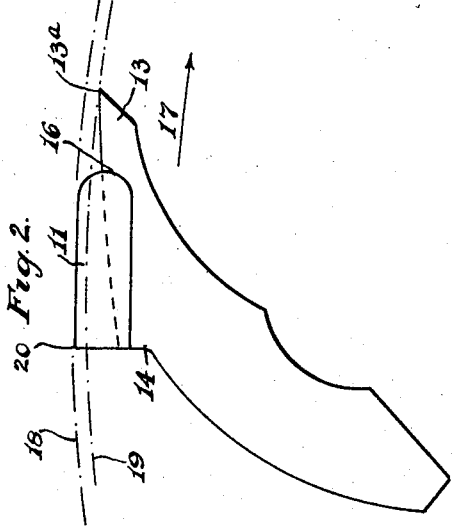
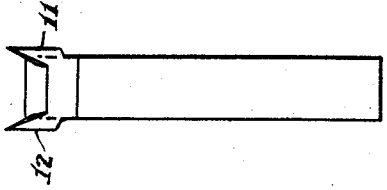
INVENTOR
Charles Simeon Busque
BY
Harold D. Penney, ATTORNEY.

Patented Aug. 25, 1931

1,820,434

UNITED STATES PATENT OFFICE

CHARLES S. BUSQUE, OF ST. GIDEON DE BEAUCE, QUEBEC, CANADA

SAW

Application filed October 24, 1930. Serial No. 491,047.

This invention relates to improvements in circular saw teeth and more particularly to saw teeth of the insertible type, such as used in saw mills for cutting lumber, and it consists in the novel features, which are hereinafter more fully described.

One of the objects of my invention is to provide teeth for saws of a design adapted for sawing across the grain of the wood, as may be required in logging and pulp cutting operations, lumber manufacturing plants, butting machines, etc. as well as for sawing lengthwise the grain or with the grain, as in most lumber sawing.

Another object of my invention is to design a saw tooth, which will have the advantage of making cleaner cuts in both lumber sawing and general cross-cutting.

Another object of my invention is to save labor and time consumed in refiling saw teeth by providing a saw tooth of a design, which will be less frequently worn down by use.

A further object of my invention is to save power by providing a saw tooth, which requires less effort to propel it through the wood.

A still other object of my invention is to provide insertible saw teeth which, when new, may be readily introduced into old saws to replace one or more worn teeth therein, without thereby interfering with the proper functioning of the saw.

Another object of my invention is to prevent springing or deflection of the saw teeth or parts thereof as when encountering tough parts in the wood, such as frozen knots at a diagonal with the grain.

A further object of the invention is to prevent wabbling of the saw.

A still further object of my invention is to leave the wood adjacent the cut therein substantially smooth and even without any fibers being torn therefrom in cross-cutting as in saws of the present design.

Other objects and advantages will hereinafter appear.

I attain these objects by the saw tooth, one form of which is illustrated in the accompanying drawings or by any mechanical equivalent or obvious modification of the same.

In the drawings,

Fig. 1 is an end view of my improved saw tooth, looking from left to right in Fig. 2.

Fig. 2 is a side view of my improved saw tooth, which is shown as of the insertible type.

Fig. 3 is an end view of my improved saw tooth, looking from right to left in Fig. 2.

Fig. 4 is a plan view of the saw tooth, which is shown in Fig. 2.

Fig. 5 is a sketch, illustrating the imperfect action of the ordinary chisel pointed or edged saw tooth in cross-cutting, the saw tooth ripping away the fibres of the wood.

Fig. 6 is a sketch, illustrating the perfected action of my improved saw tooth in severing the fibres of the wood by the incision of grooves thereinto by means of flanking blades or flanges on the saw tooth and the scooping of the detached and isolated fiber segments between the said grooves by the chisel point or edge of the tooth.

Like numerals refer to like parts throughout the several views.

In the drawings 11 and 12 designate a pair of parallel flanking knife edged incision blades or flanges on a saw tooth, which form therebetween a channel shaped groove 15 on the outer end of the tooth, as shown in Figs. 1, 3 and 4.

The said blades or flanges 11 and 12 have thereon two relatively long parallel edges, and they are shown as longer in the direction of rotation of the saw than the chisel point or edge 13 of the saw tooth, which edge is shown as positioned forwardly of said blades 11 and 12.

The blades 11 and 12 are rounded on their forward ends as at 16, Fig. 2, and are shown as extending in a substantially straight line to the heel 14 of the tooth.

The direction of rotation of the saw is indicated by the arrow 17 in Fig. 2; and the dot and dash arcuate lines 18 and 19 represent respectively the paths of the leading point 13a of the chisel point or edge 13 of the saw tooth and the trailing points 20 of said blades 11 and 12 during the rotation of the saw.

Ordinary chisel pointed or chisel edged teeth have a tendency to "draw" or feed excessively, when employed to saw across the grain, to the point of making such teeth useless for this purpose; this is due to the fact that when sawing by means of these chisel pointed or edged teeth the fibers of the wood are being ripped from the body of the wood when the latter is not being cut on both sides of the line of sawing in a direction towards the center of the saw and in advance of or past the circular line 19 which is described by the chisel points or edges 13a, as is done by means of my improved saw tooth.

In Fig. 5 an illustration is given of the manner in which standard saw teeth are ripping away the fibers of the wood in crosscutting. This action is due to the fact that the fibers 21 are subjected to a bending strain and a shearing strain across the grain of the wood by the action of the saw tooth point or edge; and, the resistance of the fibers 21 to bending and shear across the grain being greater than their resistance to shear lengthwise the grain, the fibers 21 are being ripped from the body 22 of the wood to an extent that leaves the surface of the wood multilated adjacent the cut; and the wood is being drawn by this ripping action towards the saw, thereby producing excessive feed, as hereinbefore mentioned.

In Fig. 6 an illustration is given of the more perfect action of my improved saw tooth whereby lateral grooves 23 and 24 are formed in the body 22 of the wood across the fibers 21 thereof by means of said flanking incision blades 11 and 12, whereof the rounded forward ends 16 are provided thereon to prevent ripping thereby of said fibers 21.

Said blades 11 and 12 act by pressure only, thereby severing the fibers 21 of the wood on both sides of and in advance of the action of the chisel point or edge 13 of the saw tooth, of which the action is restricted to scooping out the fragments of the fibers 21, which are left between the lateral grooves formed by the action of said blades 11 and 12; this action together with that of the chisel point or edge 13 leaves a shallow tongue 25 between the remnants of said grooves 23 and 24, after the major part of the material between said grooves has been removed by said point or edge 13.

Said blades 11 and 12 are set to extend further outwardly from the saw tooth than the point 13a of said chisel edge 13, whereby the wood 22 is engaged by said blades 11 and 12 in advance of said point 13a, thereby forming said flanking grooves 23 and 24 in advance of the scooping action by said chisel point or edge 13, and thereby preventing ripping of the fibers 21 by the latter.

The above described arcuate lines 18 and 19 designate respectively the furthest extent of the action respectively of said blades 11 and 12 and said point 13a. The distance between said lines 18 and 19 determines the depth of what is left of said flanking grooves 23 and 24 after the scooping action by said chisel point or edge 13, also the original depth of said grooves before the commencement of the action of said point 13a.

It is to be understood that the action of successive saw teeth during the continued revolution of the saw keeps extending the said grooves 23 and 24 across the wood 22, and the fragments of the fibers 21 between said grooves are being continually removed from the tongue 25 between said grooves until the body 22 of wood is completely sawed across, the last vestige of the tongue 25 falling away from the parted fragments of the wood 22 without having its fiber fragments scooped up by the chisel point or edge 13.

The above described design and action of my improved saw tooth allows a relatively very acute angle to be provided between the outer end of a saw tooth and the said lines 18 and 19, thereby causing the wear on said chisel point 13 and blades 11 and 12 to be exerted in a direction, which is almost tangential, or parallel to said lines 18 and 19, instead of being radial with relation to the saw.

This feature allows the introduction of one or a few new saw teeth among a set of already used saw teeth without requiring more than a few expert strokes of a file to make them coincide with the relative positions of the old teeth, to obtain perfect functioning of the saw.

The provision of the flanking blades 11 and 12, which are preferably integral with the tooth, prevents misalignment and springing of the saw teeth between said chisel or edge 13 and said blades 11 and 12 when encountering tough substances, such as frozen knots at a diagonal with the grain of the wood, when more resistance is encountered by the sides of the teeth which first engage these obstacles; the presence of said flanking blades on the saw tooth integrally therewith and with said chisel point 13 resists deflection of the tooth towards the side thereof, which encounters the lesser resistance thereto.

The copious length of the parallel flanking blades 11 and 12 causes the outer edges of the latter to be pressed with greater force into initial cuts traced by the rounded forward ends 16 thereof, and gradually to deepen the said cuts, thereby holding the chisel point or edge 13 of the tooth intermediate of the said pair of cuts formed by said blades 11 and 12 and in perfect alignment therewith, thereby preventing wabbling of the saw and enhancing the proper functioning of the same.

The shavings, which are scooped up by the chisel points or edges 13 between said grooves 23 and 24 and inwardly of said tongue 25, as shown in Fig. 6, are rolled into the gullet of the saw, until they are ejected from the cut in the wood, leaving no particles to be wedged between the faces of the cut in the wood and the blade of the saw, thereby reducing the resistance to the rotation of the saw and thereby reducing the power consumed by the saw.

The said incision blades 11 and 12 are positioned substantially parallel to each other as shown in Fig. 4; the inner sides of said blades are shown in Figs. 1 and 3 as bevelled to a substantially sharp angle, to promote incision or cutting by said blades, and the outer sides of said blades are almost but not quite parallel to the sides of the saw tooth, being slightly bevelled inwardly with relation to the saw, to reduce friction of said outer sides with the wood during the operation of the saw.

Many changes may be made in the details of my improved circular saw teeth without departing from the main scope of my invention, and parts of my invention may be used without other parts.

I do not, therefore, restrict myself to the details as shown in the drawings, but I intend to include also all mechanical equivalents and obvious modifications of the same within the scope of my invention.

I claim as my invention and desire to secure by Letters Patent:

1. In a circular saw tooth a chisel edge on the outer end of the tooth and a pair of incision blades, positioned to flank the outer end of the saw tooth, forming therebetween a channel shaped groove on said end, the outer edges of said blades extending further outwardly than the forward point of said chisel edge, said blades being shaped to bite into the wood without ripping it, thereby to form grooves in the wood on the flanks of the part thereof, which is to be removed by said chisel edge and in advance of the action of said chisel edge, thereby preventing ripping of the wood by said chisel edge.

2. The elements of claim 1, said incision blades being positioned substantially parallel to each other and to said saw tooth, thereby avoiding ripping of the wood thereby.

3. The elements of claim 1, said incision blades being integral with said saw tooth and said chisel edge thereon, thereby enhancing the strength and rigidity of said tooth.

4. The elements of claim 1, said incision blades having the forward ends thereof rounded, to prevent ripping of the wood thereby.

5. The elements of claim 1, said incision blades having thereon at the outer edges thereof knife edges, whereby effectively to cut grooves in the wood by pressure, without ripping the same.

6. The elements of claim 1, the outer end of said saw tooth being inclined rearwardly and the outer edges of said blades being substantially in line with the arc of revolution thereof, thereby enabling said blades gradually to deepen the grooves formed thereby.

CHARLES S. BUSQUE.